(12) United States Patent
Kikuchi et al.

(10) Patent No.: US 10,177,390 B2
(45) Date of Patent: Jan. 8, 2019

(54) FUEL CELL SYSTEM AND METHOD FOR CONTROLLING THE SAME

(71) Applicant: HONDA MOTOR CO., LTD., Tokyo (JP)

(72) Inventors: Go Kikuchi, Wako (JP); Chihiro Wake, Wako (JP); Yuji Matsumoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 987 days.

(21) Appl. No.: 14/224,073

(22) Filed: Mar. 25, 2014

(65) Prior Publication Data

US 2014/0295306 A1 Oct. 2, 2014

(30) Foreign Application Priority Data

Mar. 27, 2013 (JP) .................................. 2013-067543

(51) Int. Cl.
*H01M 8/04303* (2016.01)
*H01M 8/04223* (2016.01)
(Continued)

(52) U.S. Cl.
CPC ......... *H01M 8/04303* (2016.02); *B60L 1/003* (2013.01); *B60L 3/0053* (2013.01);
(Continued)

(58) Field of Classification Search
CPC .............................................. H01M 8/04223
See application file for complete search history.

(56) References Cited

U.S. PATENT DOCUMENTS

| 6,964,821 B2 | 11/2005 | Hirakata | |
|---|---|---|---|
| 2002/0094469 A1* | 7/2002 | Yoshizumi | ........ H01M 8/04089 429/411 |

(Continued)

FOREIGN PATENT DOCUMENTS

| JP | 2001-351667 | 12/2001 |
|---|---|---|
| JP | 2003-115317 | 4/2003 |

(Continued)

OTHER PUBLICATIONS

Japanese Office Action for corresponding JP Application No. 2013-067543, dated Oct. 30, 2014.

*Primary Examiner* — Barbara L Gilliam
*Assistant Examiner* — Nathanael T Zemui
(74) *Attorney, Agent, or Firm* — Mori & Ward, LLP

(57) ABSTRACT

In a method for controlling a fuel cell system, a shutoff valve is opened to supply a fuel gas from a storage container to a fuel cell after a fuel cell system shutdown instruction is sent to the fuel cell system so that the fuel cell generates and discharges electricity. The storage container is supplied to the fuel gas supplied from a fuel supply source provided outside the fuel cell system in response to a filling instruction to supply the fuel gas to the storage container. A data signal indicating a state of the storage container is transmitted to the fuel supply source. The shutoff valve is closed and the storage container is supplied to the fuel gas supplied from the fuel supply source if the filling instruction is output while opening the shutoff valve after the fuel cell system shutdown instruction is sent.

8 Claims, 9 Drawing Sheets

(51) Int. Cl.
*H01M 8/04228* (2016.01)
*H01M 8/04082* (2016.01)
*B60L 1/00* (2006.01)
*B60L 3/00* (2006.01)
*B60L 3/04* (2006.01)
*B60L 7/12* (2006.01)
*B60L 11/18* (2006.01)

(52) U.S. Cl.
CPC ............. *B60L 3/04* (2013.01); *B60L 7/12* (2013.01); *B60L 11/1805* (2013.01); *B60L 11/1883* (2013.01); *B60L 11/1887* (2013.01); *B60L 11/1892* (2013.01); *B60L 11/1898* (2013.01); *H01M 8/04201* (2013.01); *H01M 8/04223* (2013.01); *H01M 8/04228* (2016.02); *B60L 2210/10* (2013.01); *B60L 2240/36* (2013.01); *B60L 2240/80* (2013.01); *B60L 2250/16* (2013.01); *Y02T 10/7216* (2013.01); *Y02T 90/16* (2013.01); *Y02T 90/34* (2013.01)

(56) References Cited

U.S. PATENT DOCUMENTS

| | | | |
|---|---|---|---|
| 2012/0125482 A1* | 5/2012 | Mori | F17C 5/007 141/98 |
| 2012/0251911 A1 | 10/2012 | Kikuchi et al. | |
| 2012/0276460 A1* | 11/2012 | Kumei | H01M 8/04104 429/410 |
| 2012/0308906 A1* | 12/2012 | Paganelli | H01M 8/04097 429/415 |

FOREIGN PATENT DOCUMENTS

| | | | | |
|---|---|---|---|---|
| JP | 2007-278467 | 10/2007 | | |
| JP | 2009-138384 | 6/2009 | | |
| JP | 2010-177111 | 8/2010 | | |
| JP | 2011-033068 | 2/2011 | | |
| JP | WO 2011042932 A1 * | 4/2011 | ........ | H01M 8/04104 |
| JP | 2012-216474 | 11/2012 | | |

* cited by examiner

FUEL CELL SYSTEM AND METHOD FOR CONTROLLING THE SAME

CROSS-REFERENCE TO RELATED APPLICATIONS

The present application claims priority under 35 U.S.C. § 119 to Japanese Patent Application No. 2013-067543, filed Mar. 27, 2013, entitled "Method for Controlling Fuel Cell System." The contents of this application are incorporated herein by reference in their entirety.

BACKGROUND

1. Field

The present disclosure relates to a fuel cell system and a method for controlling the fuel cell system.

2. Description of the Related Art

Fuel-cell vehicles include a fuel cell system serving as a power supply system. A fuel cell starts generating electricity if hydrogen gas serving as fuel gas and air serving as oxidant gas are supplied. To supply hydrogen gas to the fuel cell, an anode flow passage of the fuel cell has a hydrogen tank connected thereto via a hydrogen gas feed pipe. In addition, to supply air to the fuel cell, a cathode flow passage of the fuel cell has a compressor connected thereto via an air feed pipe. When the fuel cell system starts, the fuel cell system starts supplying hydrogen gas and air to start generating electricity using the fuel cell.

When the system is shut down and if oxygen remains in the cathode flow passage, the potential of the cathode of the fuel cell becomes high immediately after the system restarts and hydrogen is fed to an anode system. Accordingly, a solid polymer electrolyte membrane may be deteriorated. To solve such a problem, even when the fuel cell system is shut down, the fuel cell system causes the fuel cell to continue electrical generation and discharge using oxygen remaining in the cathode flow passage. In this manner, the fuel cell system causes the fuel cell to be inactive and, thereafter, completely stops (refer to, for example, Japanese Unexamined Patent Application Publication No. 2003-115317). In addition, in this discharge process, to further prevent oxygen from passing from the cathode side to the anode side, it is desirable that the remaining oxygen be consumed on the cathode side and extra hydrogen gas be supplied from the hydrogen tank to the anode side to maintain the pressure in the anode flow passage to be high.

In addition, in recent years, a technique of filling a hydrogen tank with hydrogen gas has been actively researched. For example, Japanese Unexamined Patent Application Publication No. 2011-33068 describes the following technique. That is, when a hydrogen filling apparatus in a hydrogen fueling station is connected to a fuel-cell vehicle in order to fill a hydrogen tank of the vehicle with hydrogen gas, the vehicle sends a data signal indicating, for example, the temperature and pressure of the tank, and the station fills the tank with the hydrogen gas in an optimum manner on the basis of the received data signal. Hereinafter, such a technique of filling the tank with the hydrogen gas under communication between a vehicle and a station is referred to as "communication fueling".

SUMMARY

According to one aspect of the present invention, in a method for controlling a fuel cell system, the fuel cell system includes a fuel cell configured to generate electricity using fuel gas and oxidant gas supplied to the fuel cell. A shutoff valve is opened to supply the fuel gas from a storage container to the fuel cell after a fuel cell system shutdown instruction is sent to the fuel cell system so that the fuel cell generates and discharges electricity. The storage container is supplied to the fuel gas supplied from a fuel supply source provided outside the fuel cell system in response to a filling instruction to supply the fuel gas to the storage container. A data signal indicating a state of the storage container is transmitted to the fuel supply source. The shutoff valve is closed and the storage container is supplied to the fuel gas supplied from the fuel supply source if the filling instruction is output while opening the shutoff valve after the fuel cell system shutdown instruction is sent.

According to another aspect of the present invention, a fuel cell system includes a fuel cell, a storage container, a fuel gas feed path, a shutoff valve, a transmitter, a fuel cell system shutdown controller, a post-stop discharge controller, a filling instruction controller, and a switching controller. The fuel cell is configured to generate electricity using fuel gas and oxidant gas supplied to the fuel cell. The storage container stores the fuel gas. The fuel gas feed path connects the storage container to the fuel cell. The shutoff valve is provided in the fuel gas feed path. The transmitter is configured to transmit a data signal indicating a state of the storage container to a fuel supply source provided outside the fuel cell system. The fuel cell system shutdown controller is configured to output a fuel cell system shutdown instruction. The post-stop discharge controller is configured to open the shutoff valve to supply the fuel gas from the storage container to the fuel cell so that the fuel cell generates and discharges electricity in a case where the fuel cell system shutdown controller outputs the fuel cell system shutdown instruction. The filling instruction controller is configured to output a filling instruction to supply to the storage container the fuel gas supplied from the fuel supply source. The switching controller is configured to close the shutoff valve and supply to the storage container the fuel gas supplied from the fuel supply source if the filling instruction controller outputs the filling instruction even though the post-stop discharge controller opens the shutoff valve.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
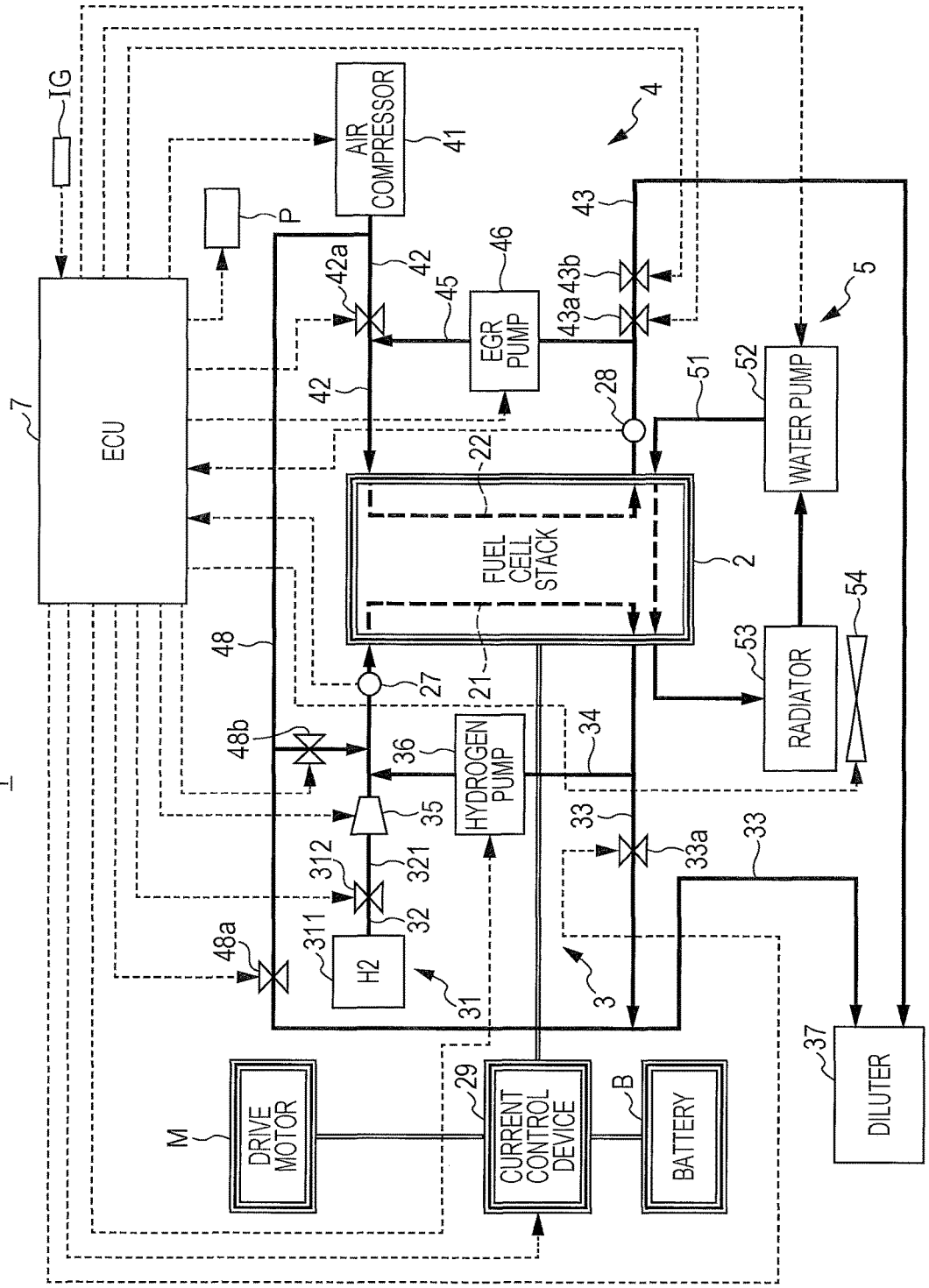
FIG. 1 is a schematic illustration of the configuration of a fuel cell system according to an embodiment of the present technology.

The embodiments will now be described with reference to the accompanying drawings, wherein like reference numerals designate corresponding or identical elements throughout the various drawings.

An exemplary embodiment of the present technology is described below with reference to the accompanying drawings. FIG. 1 is a schematic illustration of the configuration of a fuel cell system 1 based on a control method according to the present exemplary embodiment. In the whole configuration of the fuel cell system 1, the configurations of units required for generating electricity using a fuel cell stack 2 is mainly described first with reference to FIG. 1.

The fuel cell system 1 includes the fuel cell stack 2, an anode system 3 that supplies hydrogen serving as fuel gas to the fuel cell stack 2, a cathode system 4 that supplies air serving as oxidant gas to the fuel cell stack 2, a diluter 37 that performs post-processing on gas exhausted from the fuel cell stack 2, a cooling apparatus 5 that cools the fuel cell stack 2, a battery B that stores electricity generated by the fuel cell stack 2, an electronic control unit (ECU) 7, and a drive motor M that operates using electricity supplied from the fuel cell stack 2 and the battery B. The fuel cell system 1 is mounted in a fuel-cell vehicle (not illustrated) that travels using the drive motor M.

The fuel cell stack (hereinafter simply referred to as a "stack") 2 has a stack structure having, for example, several tens to several hundred stacked cells. Each of fuel cells has a structure in which a membrane-electrode assembly (MEA) is sandwiched by two separators. The membrane-electrode assembly includes an anode electrode (a negative electrode), a cathode electrode (a positive electrode), and a solid polymer electrolyte membrane sandwiched by the two electrodes. In general, each of the two electrodes includes a catalyst layer that is in contact with the solid polymer electrolyte membrane and that causes an oxidation-reduction reaction and a gas diffusion layer that is in contact with the catalyst layer. When hydrogen is supplied to an anode flow passage 21 formed adjacent to the anode electrode and if air containing oxygen is supplied to a cathode flow passage 22 formed adjacent to the cathode electrode, the stack 2 generates electricity due to an electrochemical reaction between oxygen and hydrogen.

An output electric current retrieved from the stack 2 that generates electricity is input to the battery B and the loads (e.g., the drive motor M and an air compressor 41) via a current control device 29. The current control device 29 includes a DC-DC converter (not illustrated). The current control device 29 controls the output current from the stack 2 that generates electricity through a chopping operation. In particular, in a shutdown-time charging process and an EDR discharge process (described in more detail below), the current control device 29 uses the output current from the stack 2 as a charging current for the battery B and charges the battery B while controlling the charging current at a level of a predetermined current command value.

The battery B stores the electricity generated by the stack 2 and electric energy recovered from regenerative braking by the drive motor M. In addition, when, for example, the fuel cell system is started up and the vehicle travels under high load, the electricity stored in the battery B is supplied to the load in order to compensate for the low output of the stack 2.

The anode system 3 includes a hydrogen tank 31, a hydrogen feed pipe 32 that extends from the hydrogen tank 31 to the inlet portion of the anode flow passage 21 of the stack 2, a hydrogen exhaust pipe 33 that extends from the outlet portion of the anode flow passage 21 to the diluter 37, and a hydrogen return pipe 34 that branches from the hydrogen exhaust pipe 33 and reaches the hydrogen feed pipe 32. A hydrogen circulation flow passage for the gas including hydrogen is formed by the hydrogen feed pipe 32, the anode flow passage 21, the hydrogen exhaust pipe 33, and the hydrogen return pipe 34.

The hydrogen tank 31 includes a tank body 311 that stores high-pressure hydrogen gas and a main stop valve 312 provided in the hydrogen feed pipe 32 that extends from the tank body 311.

A portion of the hydrogen feed pipe 32 downstream of the main stop valve 312 has an injector 35 provided therein. The injector 35 injects hydrogen gas newly fed from the hydrogen tank 31 toward the stack 2. Hereinafter, a portion of the hydrogen feed pipe 32 between the injector 35 and the main stop valve 312 is referred to as a "medium pressure portion 321". By maintaining the pressure inside the medium pressure portion 321 to be sufficiently high and driving the injector 35 to open and close, the pressure inside the anode flow passage 21 of the stack 2 that generates electricity (hereinafter referred to as an "anode pressure") is controlled to a predetermined target pressure. Note that even after the main stop valve 312 is closed, the anode pressure can be controlled by driving the injector 35 to open and close if a sufficient amount of the hydrogen gas remains in the medium pressure portion 321.

The hydrogen return pipe 34 has a hydrogen pump 36 provided therein. The hydrogen pump 36 pumps gas located on the "hydrogen exhaust pipe 33" side to the hydrogen feed pipe 32 and circulates the gas containing hydrogen through the hydrogen circulation flow passage. A portion of the hydrogen exhaust pipe 33 downstream of a connection portion with the hydrogen return pipe 34 has a purge valve 33a provided therein. If the density of hydrogen that circulates through the hydrogen circulation flow passage decreases, the electrical generation efficiency of the stack 2 decreases. Thus, the purge valve 33a is opened at an appropriate point in time while the stack 2 is generating electricity. In this manner, the gas inside the hydrogen circulation flow passage is exhausted to the diluter 37.

The cathode system 4 includes the air compressor 41, an air feed pipe 42 that extends from the air compressor 41 to an inlet portion of the cathode flow passage 22, an air exhaust pipe 43 that extends from an outlet portion of the cathode flow passage 22 to the diluter 37, an air return pipe 45 that branches from the air exhaust pipe 43 and reaches the air feed pipe 42, and a stack bypass pipe 48 that branches from the air exhaust pipe 43 and reaches the hydrogen feed pipe 32 and the diluter 37. An oxygen circulation flow passage for gas containing oxygen is formed by the air feed pipe 42, the cathode flow passage 22, the air exhaust pipe 43, and the air return pipe 45.

The air compressor 41 supplies air outside the system to the cathode flow passage 22 of the stack 2 via the air feed pipe 42. In addition, the air exhaust pipe 43 has a back pressure valve 43b provided therein. The back pressure valve 43b is used to control the pressure inside the cathode flow passage 22. By supplying air using the air compressor 41 and controlling the opening of the back pressure valve 43b, the pressure inside the cathode flow passage 22 of the stack 2 that is generating electricity can be controlled to an appropriate value in accordance with the electric generation state of the stack 2.

The air return pipe 45 has an EGR pump 46 provided therein. The EGR pump 46 pumps gas in the air exhaust pipe 43 to the air feed pipe 42 to circulate gas containing oxygen through the oxygen circulation flow passage. A portion of the air feed pipe 42 on the "air compressor 41" side of a connection portion with the air return pipe 45 has an inlet sealing valve 42a provided therein. The inlet sealing valve 42a prevents outside air from flowing from the air compressor 41 into the cathode flow passage 22 during the period of time during which the fuel cell system 1 is shut down. In addition, a portion of the air exhaust pipe 43 on the "diluter 37" side of a branching portion from which the air return pipe 45 branches has an outlet sealing valve 43a provided therein. The outlet sealing valve 43a prevents outside air from flowing from the diluter 37 into the cathode flow passage 22 during the period of time during which the fuel cell system 1 is shut down. The inlet sealing valve 42a and the outlet sealing valve 43a are closed with the cathode flow passage 22 filled with inactive gas having a low oxygen density during an EDR stop process (refer to, for example, FIG. 3 described below). In this manner, deterioration of the stack 2 can be prevented.

The stack bypass pipe 48 includes a bypass valve 48a that controls the flow rate of air flowing from the air compressor 41 to the diluter 37 and a scavenging valve 48b that controls the flow rate of air flowing from the air compressor 41 to the hydrogen feed pipe 32. The bypass valve 48a is open when, for example, the back pressure valve 43b is closed and, thus, diluent gas cannot be supplied from the air exhaust pipe 43 to the diluter 37. In this manner, air immediately beneath the air compressor 41 is supplied to the diluter 37. The scavenging valve 48b is open when the stack 2 stops generating electricity and if a diluent process is performed. In the diluent process, impurities remaining in the hydrogen circulation flow passage is expelled by the air supplied from the air compressor 41.

The diluter 37 dilutes the gas that contains hydrogen and that is expelled through the purge valve 33a with the gas input through the back pressure valve 43b and the bypass valve 48a descried above. Thereafter, the diluter 37 exhausts the gas to the outside of the system.

The cooling apparatus 5 includes a refrigerant circulation flow passage 51 that includes the stack 2 in its path, a water pump 52 that pumps refrigerant in the refrigerant circulation flow passage 51 in a predetermined direction, a radiator 53 that is part of the refrigerant circulation flow passage 51, and a radiator fan 54 that cools the refrigerant flowing through the radiator 53. The cooling apparatus 5 circulates the refrigerant using the water pump 52 and facilitates heat exchange between the stack 2 and the refrigerant. In addition, by cooling the refrigerant using the radiator fan 54, the cooling apparatus 5 prevents the temperature of the stack 2 from rising beyond a predetermined upper limit temperature to protect the stack 2.

The ECU 7 is an electronic control unit that controls a variety of units that constitute the fuel cell system 1. The ECU 7 includes a variety of electronic circuits, such as a central processing unit (CPU), a read only memory (ROM), a random access memory (RAM), and a variety of interfaces. In order to detect the state of the fuel cell system 1, a variety of sensors, such as an anode pressure sensor 27 and a cathode pressure sensor 28, are connected to the ECU 7.

The anode pressure sensor 27 is disposed in the hydrogen feed pipe 32. The anode pressure sensor 27 detects the anode pressure and sends a signal substantially proportional to the detected value to the ECU 7. The cathode pressure sensor 28 is disposed in the air exhaust pipe 43. The cathode pressure sensor 28 detects the cathode pressure and sends a signal substantially proportional to the detected value to the ECU 7.

A dashboard of the vehicle (not illustrated) includes an information panel P serving as a display unit for informing the driver of the state of the fuel cell system 1 and an ignition switch IG that is operated by the driver in order to instruct the fuel cell system 1 to start electrical generation using the stack 2 (i.e., start-up of the fuel cell system 1) or stop generation of electricity using the stack 2 (i.e., shutdown of the fuel cell system 1).

If the ignition switch IG is operated when the fuel cell system 1 is shut down, the ignition switch IG generates a signal instructing start-up of the fuel cell system 1. Upon receiving the start-up instruction signal from the ignition switch IG, the ECU 7 starts a system start-up process. In the system start-up process, the load is driven using the electricity stored in the battery B, and the stack 2 is set in a mode in which electrical generation is enabled. Thereafter, the vehicle travels. In addition, after the stack 2 enters the mode in which electrical generation is enabled, a contactor (not illustrated) is closed at a predetermined point in time, and the stack 2 is electrically connected to the battery B and the load. Thereafter, the system start-up is completed.

In contrast, if the ignition switch IG is operated when the fuel cell system 1 is active, the ignition switch IG generates a signal instructing shutdown of the fuel cell system 1. Upon receiving the shutdown instruction signal from the ignition switch IG, the ECU 7 starts a system shutdown process, which is described in more detail below with reference to FIG. 3. In addition, the ECU 7 displays, on the information panel P, information indicating that the system shutdown process is in execution. Upon completion of the system shutdown process, the ECU 7 opens the above-described contactor so as to electrically disconnect the stack 2 from the battery B and the load.

Figure 2:
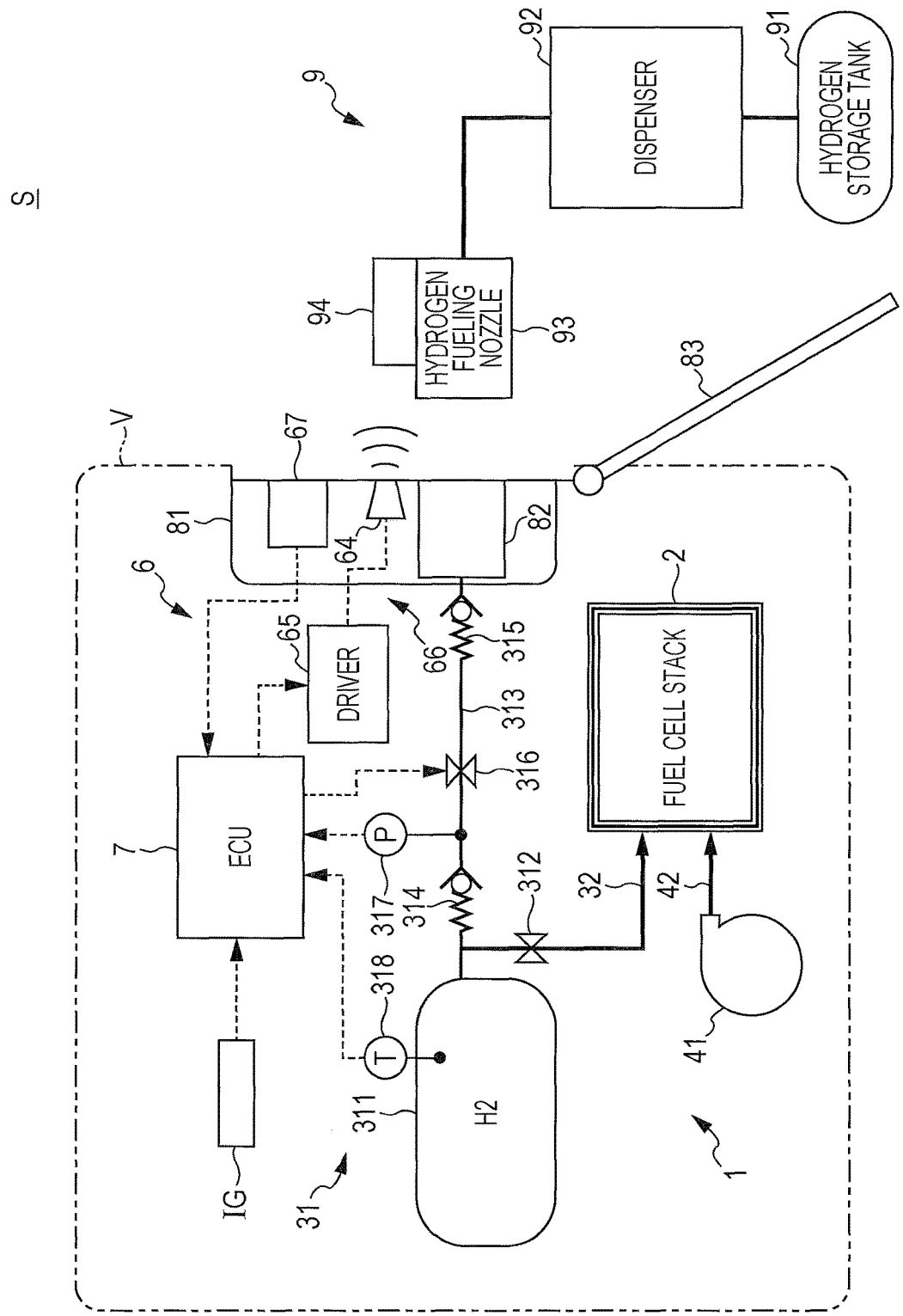
FIG. 2 illustrates the configuration of a hydrogen filling system according to the embodiment.

FIG. 2 illustrates the configuration of a hydrogen filling system S. The hydrogen filling system S includes a vehicle V having the above-described fuel cell system 1 mounted therein and a hydrogen fueling station 9 that supplies hydrogen gas to the vehicle V.

The hydrogen fueling station 9 includes a hydrogen storage tank 91 and a dispenser 92. The hydrogen storage tank 91 stores high-pressure hydrogen to be supplied to the vehicle V. The hydrogen stored in the hydrogen storage tank 91 is produced by compressing, using a compressor, the following form of hydrogen: evaporated liquid hydrogen, hydrogen produced by reforming a material using a reforming apparatus, or hydrogen produced using an electrolytic apparatus.

If a hydrogen fueling nozzle 93 of the dispenser 92 is inserted into a hydrogen inlet 82 provided in the vehicle V, the dispenser 92 decreases the pressure of the hydrogen gas supplied from the hydrogen storage tank 91, controls the flow rate of the hydrogen gas, and supplies the hydrogen gas from the hydrogen fueling nozzle 93. The hydrogen fueling nozzle 93 includes an infrared communication device 94. By inserting the hydrogen fueling nozzle 93 into the hydrogen inlet 82 of the vehicle V, the infrared communication device 94 can receive and transmit an infrared data signal from and to a communication system 6 mounted in the vehicle V. The communication system 6 is described in more detail below.

The configurations of the units of the fuel cell system 1 required for filling the hydrogen tank 31 with hydrogen gas are described below with reference to FIG. 2.

The hydrogen tank 31 further includes a hydrogen inlet tube 313 that extends from the tank body 311, a tank pressure sensor 317, and a tank temperature sensor 318. One end of the hydrogen inlet tube 313 is connected to the tank body 311, and the other end is connected to the hydrogen inlet 82 formed in a lid box 81 described below.

The hydrogen inlet tube 313 includes check valves 314 and 315 and a fueling path shutoff valve 316. The fueling path shutoff valve 316 shuts off the flow of gas into the tank body 311 and the flow of gas from the tank body 311. The check valves 314 and 315 are disposed in the vicinity of the tank body 311 and the hydrogen inlet 82, respectively. The check valves 314 and 315 prevent the hydrogen from flowing back from the tank body 311 to the outside of the vehicle V.

The tank pressure sensor 317 detects the hydrogen pressure in the hydrogen inlet tube 313 of the hydrogen tank 31 and sends a detection signal that is substantially proportional to the detected value to the ECU 7. The tank temperature sensor 318 detects the hydrogen temperature in the tank body 311 of the hydrogen tank 31 and sends a detection signal that is substantially proportional to the detected value to the ECU 7.

The lid box 81 is disposed on the side rear of the vehicle V. The lid box 81 surrounds the hydrogen inlet 82 to protect the hydrogen inlet 82 from damaging. The lid box 81 has a lid 83 attached thereto in a pivotal manner. In the hydrogen fueling station 9, the user opens the lid 83 to expose the hydrogen inlet 82 to the outside. Thereafter, the user inserts the hydrogen fueling nozzle 93 of the dispenser 92 into the hydrogen inlet 82. In this manner, the user can fill the tank with hydrogen.

The fuel cell system 1 includes the communication system 6 used for performing communication fueling described above. The communication system 6 includes the ECU 7, an infrared transmitter 66, and a lid switch 67.

The lid switch 67 is mounted in the lid box 81. The lid switch 67 detects the open/close state of the lid 83. When the lid 83 is closed and, thus, the hydrogen inlet 82 is protected inside the lid box 81, the lid switch 67 sends a close signal indicating such information to the ECU 7. In contrast, if the lid 83 is open and, thus, the hydrogen inlet 82 is exposed to the outside, the lid switch 67 sends an open signal indicating such information to the ECU 7. Note that one of the close signal and the open signal may be a null signal.

The infrared transmitter 66 is formed from an infrared LED 64 and the driver 65 for the infrared LED 64. The driver 65 turns on and off the infrared LED 64 on the basis of a data signal sent from the ECU 7.

During the communication fueling, by turning on and off the infrared LED 64 using the driver 65, the ECU 7 can send, to the infrared communication device 94 in the hydrogen fueling station 9, a data signal generated on the basis of the pressure and the temperature detected by the tank pressure sensor 317 and the tank temperature sensor 318 and a filling stop instruction signal instructing stoppage of filling of the hydrogen gas.

The communication system 6 having such a configuration starts and stops the operation thereof in response to opening and closing of the lid 83 by the user. A procedure for start-up of the communication system 6 and the performance of the communication fueling is described below.

If the user stops the vehicle V and performs a stop operation of the ignition switch IG and, thereafter, opens the lid 83, the lid switch 67 detects that the lid 83 is open and sends an open signal indicating that the lid 83 is open to the ECU 7. Upon receiving the open signal, the ECU 7 starts supplying electricity from a battery (not illustrated) to the infrared transmitter 66. In this manner, transmission of a data signal is enabled. Subsequently, if the hydrogen fueling nozzle 93 of the hydrogen fueling station 9 is inserted into the hydrogen inlet 82 of the vehicle V and, thus, filling of hydrogen is made available and communication between the vehicle V and the hydrogen fueling station 9 is enabled, the ECU 7 opens the fueling path shutoff valve 316 and starts the communication fueling.

During the communication fueling, the ECU 7 sends a data signal that is generated on the basis of the pressure and the temperature detected by the tank pressure sensor 317 and the tank temperature sensor 318 and that indicates the current state of the hydrogen tank 31 to the hydrogen fueling station 9 using the infrared transmitter 66. The dispenser 92 receives the data signal sent from the vehicle V using the infrared communication device 94. Thus, the dispenser 92 recognizes the current state of the hydrogen tank 31 from the data signal and fills the hydrogen tank 31 with hydrogen while controlling the flow rate of the hydrogen in accordance with the state. Thereafter, if the amount of the hydrogen gas remaining in the hydrogen tank 31 estimated on the basis of the received data signal reaches a predetermined full tank threshold value or if a predetermined full tank condition is satisfied, fueling of hydrogen is completed.

If the communication fueling is successfully completed, the user pulls out the hydrogen fueling nozzle 93 from the hydrogen inlet 82 and closes the lid 83. When the lid 83 is closed, the lid switch 67 detects that the lid 83 is closed and sends a close signal indicating that the lid 83 is closed to the ECU 7. Upon receiving the close signal, the ECU 7 closes the fueling path shutoff valve 316 and stops supplying electricity to the infrared transmitter 66.

Figure 3:
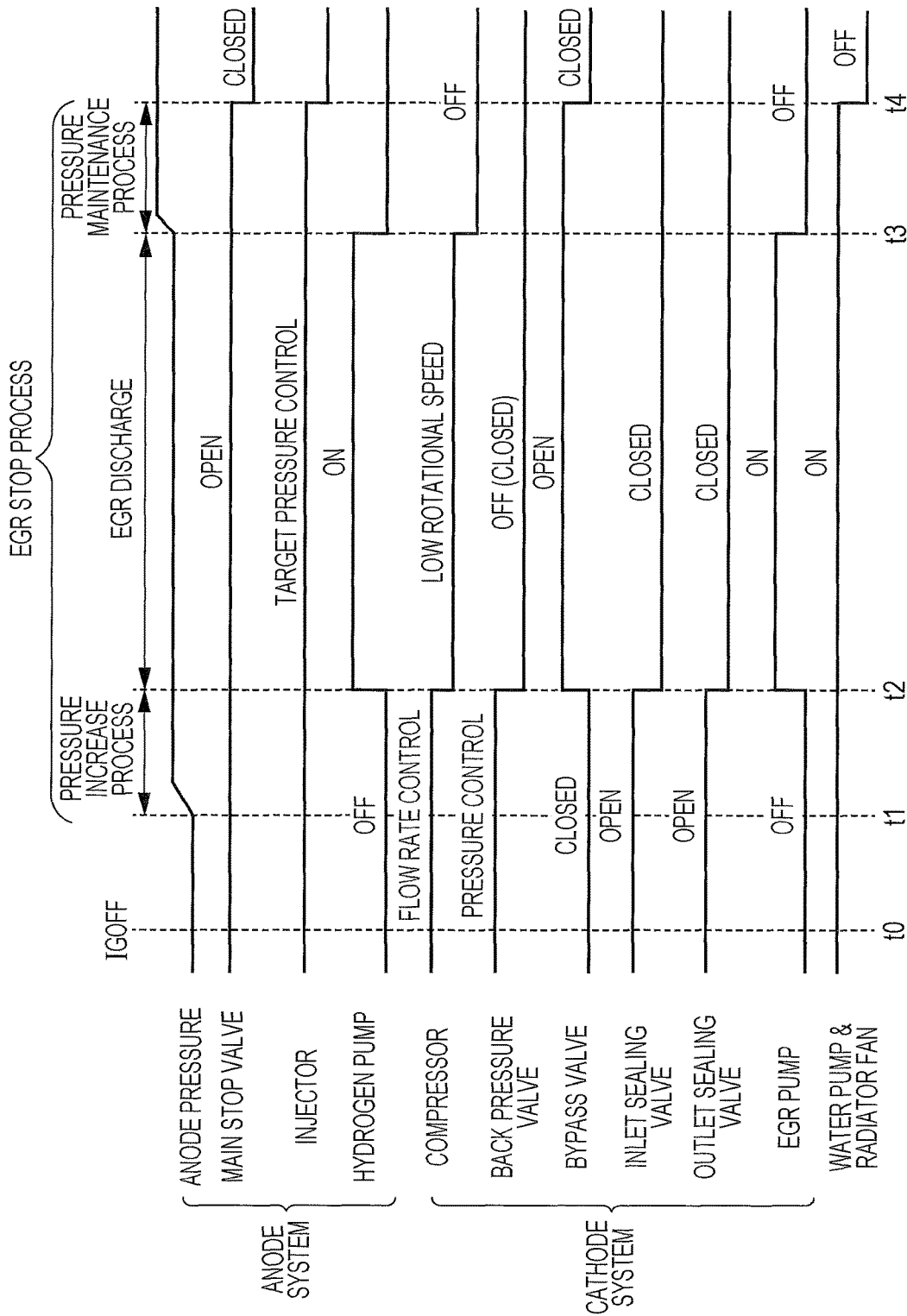
FIG. 3 is a timing diagram illustrating the control procedure for each of the units in a system shutdown process according to the embodiment.

The procedure for the system shutdown process performed after the fuel cell system shutdown instruction is sent is described next with reference to FIG. 3. FIG. 3 is a timing diagram illustrating the control procedure for each of the units in the system shutdown process. Note that in FIG. 3, interruption of the communication fueling does not occur during the system shutdown process performed after a system shutdown instruction is received.

The system shutdown process involves the following four processes: a shutdown-time charging process, an EGR stop process corresponding to a post-stop discharge step, a dilution process, and a cooling process. The dilution process and the cooling process correspond to a stop processing step.

The term "shutdown-time charging process" refers to a process in which electrical generation of the stack continues after a system shutdown instruction is received in order to prepare for the next system start-up. The shutdown-time charging process is performed immediately after a system shutdown instruction is received only when it is determined that the battery level detected when the system shutdown instruction is received is insufficient (refer to, for example, FIGS. 5, 7, and 9 described below). Note that in the timing diagram illustrated in FIG. 3, it is determined that the battery level is sufficient when the system shutdown instruction is received and, thus, the shutdown-time charging process is not performed.

The EGR stop process is performed in order to prevent the stack from deteriorating. The EGR stop process is performed between the time the system shutdown instruction is received and the time the system is completely shut down. As illustrated in FIG. 3, the EGR stop process involves the following three processes: a pressure increase process (t1 to t2), an EGR discharge process (t2 to t3), and a pressure maintenance process (t3 to t4).

In the pressure increase process, the anode pressure is increased to a desired pressure in advance before the EGR discharge process is performed. More specifically, in the pressure increase process, the main stop valve is made open to maintain a sufficient pressure in the medium pressure portion. Thereafter, the injector is feedback-controlled on the basis of the output from the anode pressure sensor so that the anode pressure is equal to a target pressure described below.

In the EGR discharge process, in order to prevent the stack from deteriorating, oxygen remaining in the cathode flow passage of the stack is consumed before the system is completely shut down. In the EGR discharge process, for the units of the anode system, the anode pressure is controlled to a predetermined target pressure (hereinafter referred to as a "discharge-time target pressure") by using the injector with the main stop valve open, and the hydrogen gas is circulated through the hydrogen circulation flow passage by the hydrogen pump. In contrast, for the units of the cathode system, the cathode pressure is maintained at a predetermined target pressure by driving a compressor with the inlet sealing valve and the outlet sealing valve closed. In addition, by driving the EGR pump and circulating the gas through the oxygen circulation flow passage, the oxygen density in the oxygen circulation flow passage is gradually decreased. In the EGR discharge process, electrical generation and discharge of the stack are performed for a predetermined period of time with the hydrogen circulation flow passage and the oxygen circulation flow passage maintained in the above-described state. In this manner, the oxygen density in the oxygen circulation flow passage is decreased. The EGR discharge process is performed until the oxygen density in the oxygen circulation flow passage decreases to a predetermined density or until a period of time needed for determining that the oxygen density is decreased to the predetermined density elapses. Note that the electric current retrieved from the stack during the EGR discharge process is supplied to, for example, the battery.

In the pressure maintenance process, the anode pressure is further increased after the EGR discharge process is completed. More specifically, in the pressure maintenance process, the anode pressure is increased to a predetermined pressure-maintenance-time target pressure that is higher than the discharge-time target pressure by the injector with the main stop valve open.

By performing the EGR stop process according to the above-described procedure, the cathode flow passage of the stack is filled with inactive gas having a low oxygen density, and the anode flow passage is maintained at a high pressure by the hydrogen gas. In this manner, permeation of the remaining oxygen from the cathode side can be prevented up to the maximum extent and, thus, deterioration of the stack can be prevented.

Note that like the above-described shutdown-time charging process, the above-described EGR stop process involves electrical generation and discharge of the stack. Accordingly, basically, the EGR stop process cannot be performed simultaneously with the shutdown-time charging process. Therefore, according to the present exemplary embodiment, if the shutdown-time charging process is performed after a system shutdown instruction is received, the EGR stop process is performed after the shutdown-time charging process is completed. However, if the shutdown-time charging process is not performed, the EGR stop process is performed immediately after a system shutdown instruction is received.

In the dilution process, the hydrogen gas remaining in the diluter when the system shutdown instruction is received is diluted and, thus, the hydrogen density in the diluter is decreased to a predetermined density after a predetermined period of time elapses. Since the dilution process can be performed when the hydrogen gas need not be actively supplied to the stack and if the diluent gas can be introduced into the diluter by driving the compressor, the dilution process can be performed simultaneously with the above-described shutdown-time charging process and the above-described EGR stop process. Thus, according to the present exemplary embodiment, the dilution process is started immediately after a system shutdown instruction is received.

More specifically, as illustrated in FIG. 3, in the dilution process, by appropriately opening and closing, for example, the back pressure valve and the stack bypass valve with the compressor driven, the gas exhausted from the stack and the gas located immediately beneath the compressor can be introduced into the diluter. By using the gas as diluent gas, the hydrogen in the diluter is diluted. Note that when the outlet sealing valve is closed, the diluent gas cannot be introduced into the diluter even if the back pressure valve is open. Accordingly, when the EGR discharge process is performed, the diluent gas is introduced into the diluter by appropriately opening and closing the stack bypass valve.

As illustrated in FIG. 3, in the cooling process, by appropriately driving the water pump and the radiator fan (refer to FIG. 3), the temperature of the stack is decreased to, for example, the normal temperature after a predetermined period of time elapses. The cooling process is performed by driving the units that are not related to the state of the electrical generation of the stack and the state of the diluter, such as the water pump and the radiator fan, when the hydrogen gas need not be actively supplied to the stack. Accordingly, the cooling process can be performed simultaneously with the shutdown-time charging process, the EGR stop process, and the dilution process. Thus, according to the present exemplary embodiment, the cooling process is started immediately after a system shutdown instruction is received.

A particular control procedure taken when an interruption of the communication fueling occurs during the system shutdown process illustrated in FIG. 3 is described with reference to the following three examples.

First Example

Figure 4:
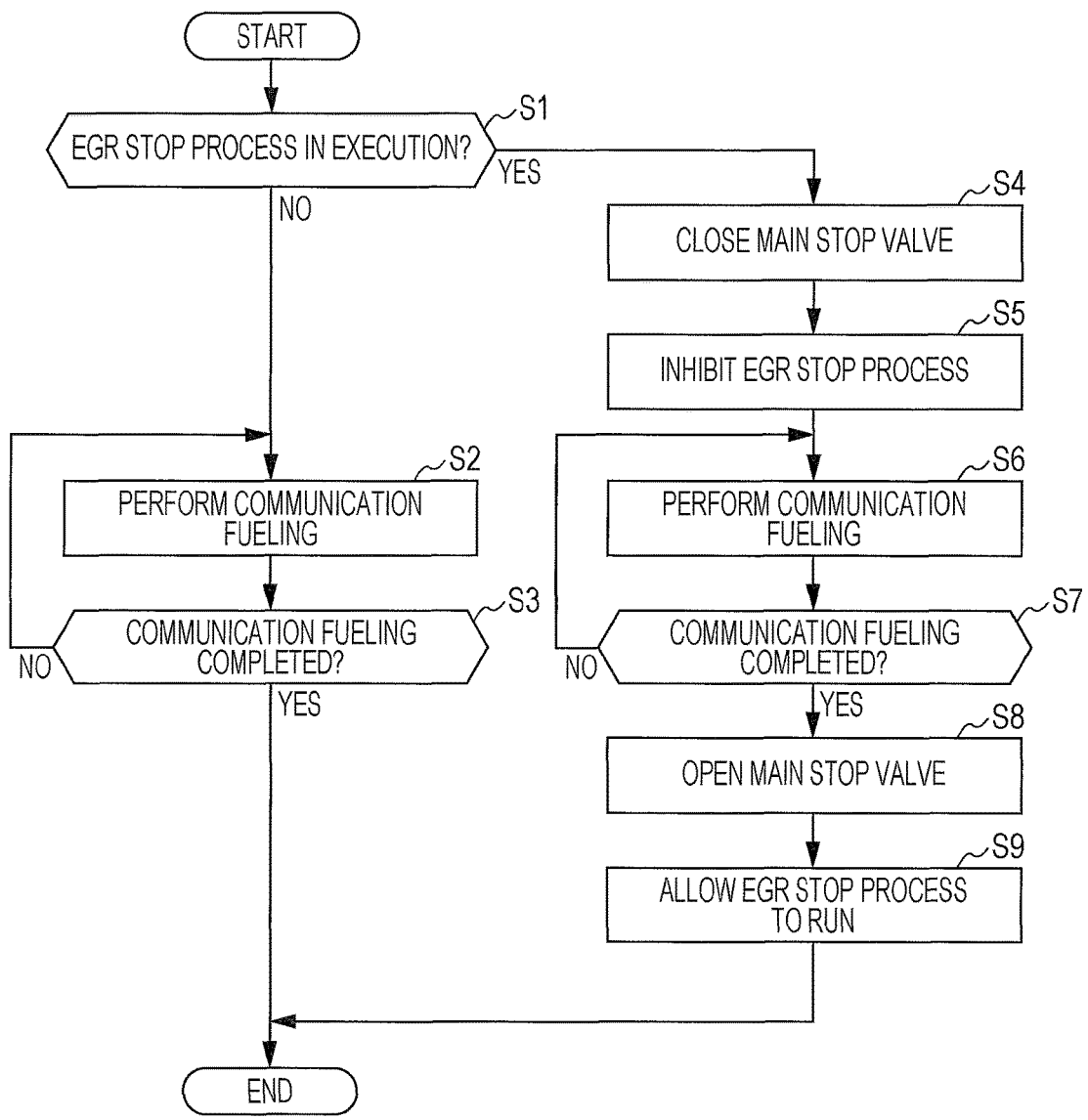
FIG. 4 is a flowchart illustrating the procedure for interruption control according to a first example.

FIG. 4 is a flowchart illustrating the procedure for interruption control performed by the ECU when a communication fueling request is received after a system shutdown instruction is received, according to a first example. The process illustrated in FIG. 4 starts when the user performs a predetermined operation instructing start of the communication fueling (e.g., when the lid is opened or when the hydrogen fueling nozzle of the station is inserted into the hydrogen inlet of the vehicle) after a system shutdown instruction is received.

In step S1, it is determined whether the EGR stop process is in execution. If the determination in step S1 is YES, that is, if the EGR stop process is currently in execution, the processing proceeds to step S4. However, if the determination in step S1 is NO, that is, if the EGR stop process is not currently in execution, the processing proceeds to step S2.

In step S2, the communication fueling is executed, and the processing proceeds to step S3. More specifically, in step S2, a data signal indicating the current state of the high-pressure tank is sent to the station and, in the station, the high-pressure tank is filled with hydrogen gas in an optimum manner on the basis of the received data signal. Note that if, at that time, the dilution process or the cooling process is in execution, the communication fueling is performed simultaneously with the dilution process or the cooling process. In step S3, it is determined whether the communication fueling is completed. If the determination in step S3 is NO, the processing returns to step S2, where the communication fueling continues. However, if the determination is YES, the processing is completed.

In step S4, the main stop valve is closed so that outflow of the hydrogen gas from the high-pressure tank is stopped. Thereafter, the processing proceeds to step S5. In this manner, a variation of the state of the high-pressure tank is minimized and, thus, the accuracy of the data signal indicating the state of the high-pressure tank sent from an infrared transmitter can be increased.

In step S5, the EGR stop process is inhibited. Thereafter, the processing proceeds to step S6. Thus, the EGR stop process currently executed is suspended until the process is allowed to resume in step S9 described below. More specifically, the EGR stop process is suspended by temporarily stopping all or some of the following processes: the anode pressure control using the injector, circulation of the hydrogen gas using the hydrogen pump, circulation of air using the EGR pump, and discharge of the stack.

In step S6, the communication fueling is performed. Thereafter, the processing proceeds to step S7. In the communication fueling, a data signal indicating the state of the high-pressure tank is sent from the infrared transmitter to the station. At the same time, the high-pressure tank is filled with the hydrogen gas supplied from the station. In step S7, it is determined whether the communication fueling is completed. If the determination in step S7 is NO, the processing returns to step S6, where the communication fueling continues. However, if the determination is YES, the processing proceeds to step S8. In step S8, the main stop valve closed in step S4 is opened again. Thereafter, the processing proceeds to step S9, where the suspended EGR stop process is allowed to resume. Subsequently, the processing is completed.

Figure 5:
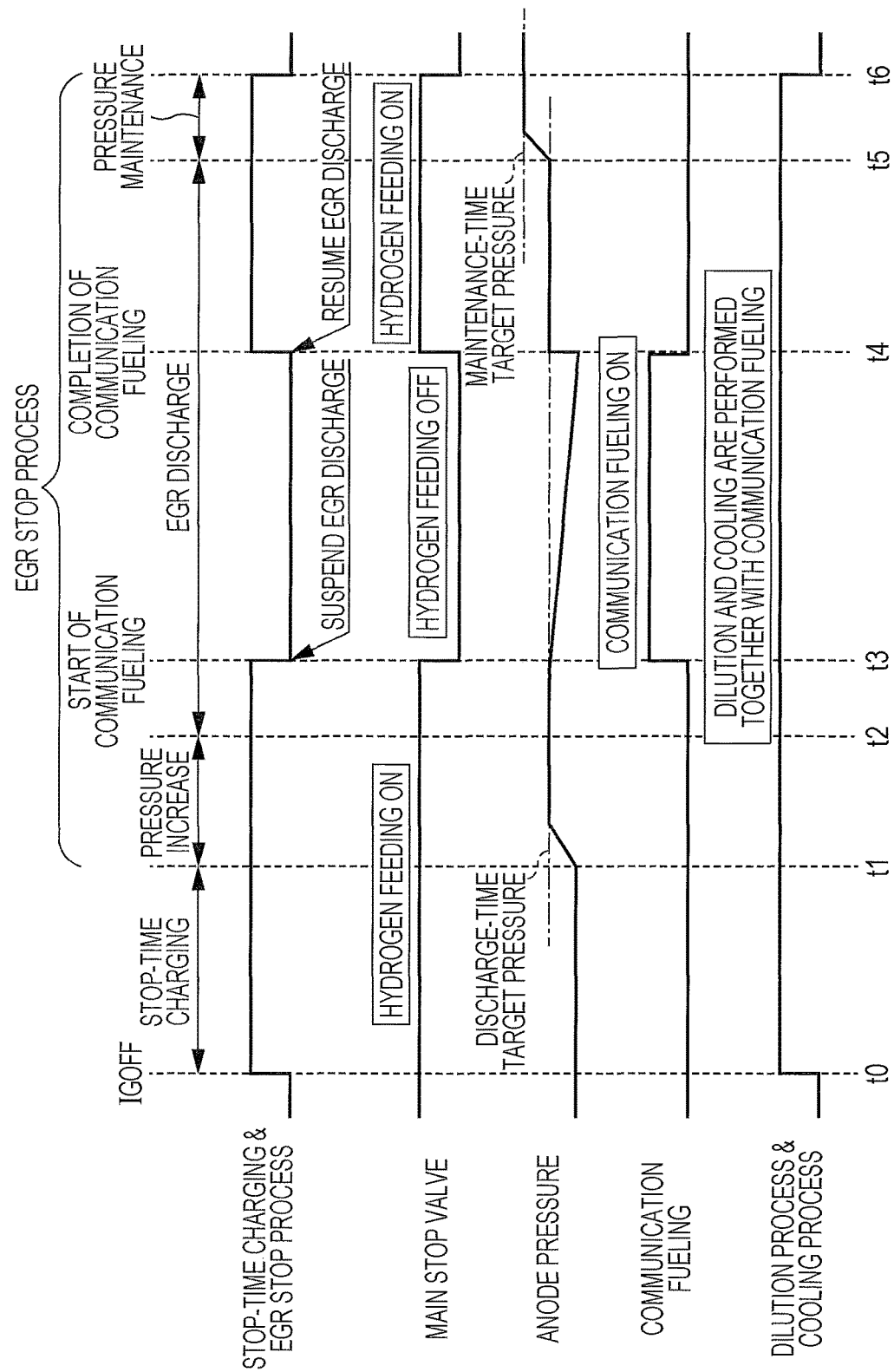
FIG. 5 is a timing diagram illustrating a particular example of the interruption control according to the first example.

FIG. 5 is a timing diagram illustrating a particular example of the interruption control according to the first example. In the example of FIG. 5, a system shutdown instruction is received at a time t0. Thus, the cooling process and the dilution process are simultaneously started at the time t0. Thereafter, at a time t1, the shutdown-time charging process is completed. Accordingly, the EGR stop process is started at the time t1.

As described above, the EGR stop process involves the following three processes: the pressure increase process, the EGR discharge process, and the pressure maintenance process. The pressure increase process is performed from the time t1 to the time t2. Thus, the anode pressure is increased to the discharge-time target pressure. After the pressure increase process is completed, the EGR discharge process is started at the time t2. Thus, oxygen remaining on the cathode side is consumed with the anode pressure maintained at the discharge-time target pressure.

After the EGR discharge process starts at the time t2, the user performs an operation to instruct start of the communication fueling at a time t3. Thus, the interruption control illustrated in FIG. 4 starts at the time t3. Accordingly, at the time t3, the main stop valve is closed (refer to step S4), and the communication fueling starts (refer to step S6). In addition, since, at the time t3, the main stop valve is closed and the currently running EGR discharge process is suspended (refer to step S5), the anode pressure gradually decreases, as illustrated in FIG. 5. In this manner, by starting the communication fueling after the main stop valve is closed, the accuracy of the data signal indicating the state of the high-pressure tank and sent from the infrared transmitter during the communication fueling can be increased. Furthermore, if an operation to instruct start of the communication fueling is performed, the EGR discharge process is suspended after the main stop valve is closed. In contrast, the dilution process and the cooling process are performed simultaneously with the communication fueling.

Subsequently, the communication fueling is completed at a time t4. Accordingly, the main stop valve is opened (refer to step S8). In addition, the EGR discharge process suspended from the time t3 is resumed (refer to step S9). Thereafter, at a time t5, the EGR discharge process is completed. Accordingly, the pressure maintenance process is started at the time t5. At a time t6, the pressure maintenance process is completed. In this manner, the fuel cell system is completely shut down.

Second Example

Figure 6:
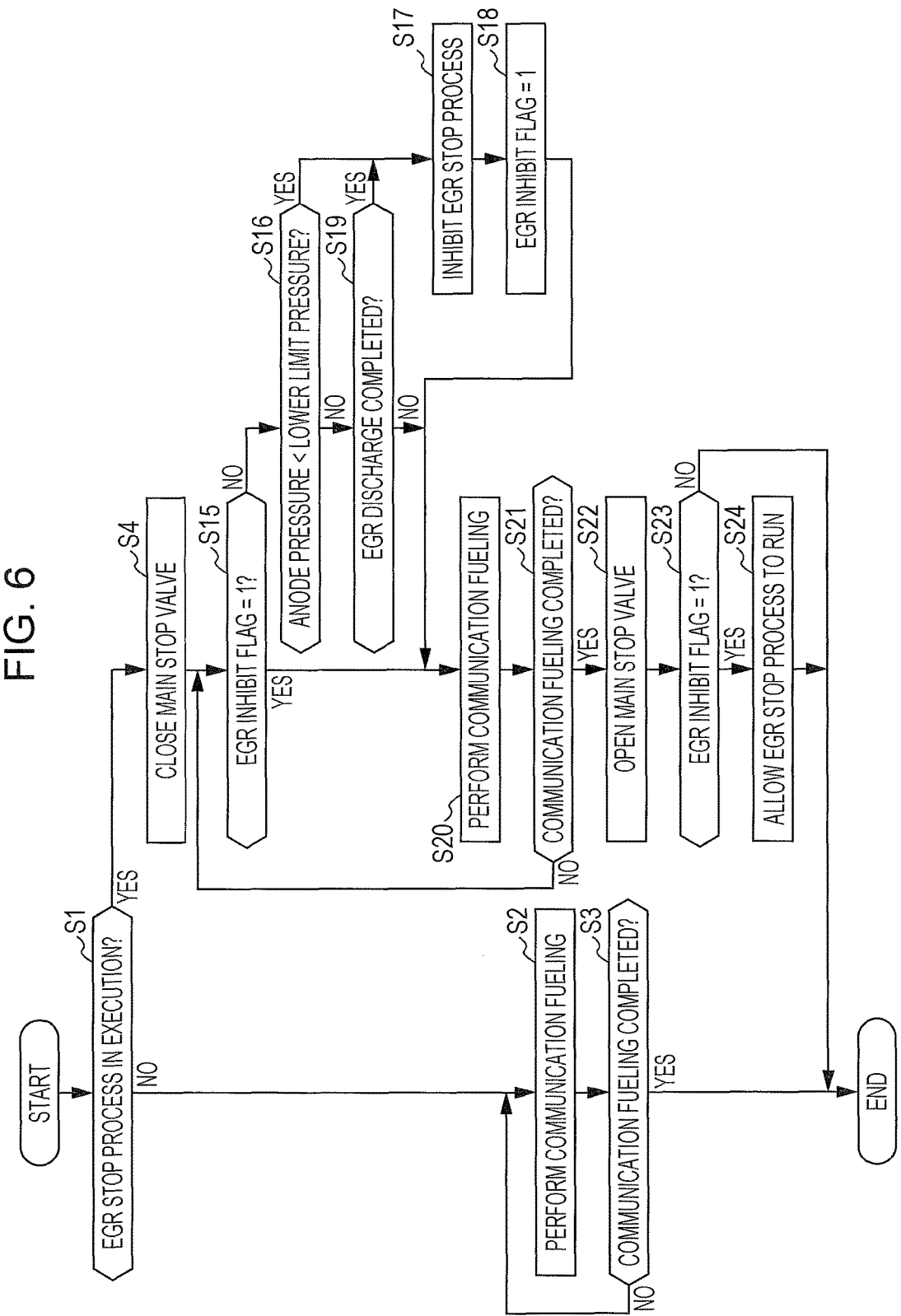
FIG. 6 is a flowchart illustrating a particular example of the interruption control according to a second example.

FIG. 6 is a flowchart illustrating a particular procedure for the interruption process of a second example performed by the ECU when a communication fueling request is received after a system shutdown instruction is received. Like the processing illustrated in FIG. 4, the processing illustrated in FIG. 6 starts when the user performs a predetermined operation to instruct start of the communication fueling after a system shutdown instruction is received. Note that in the processing illustrated in FIG. 6, the processing in steps S1 to S4 is the same as that in FIG. 4. Accordingly, detailed description of the processing is not repeated. The interruption control according to the second example differs from that according to the first example in that after the main stop valve is closed in step S4, the EGR stop process continues until the last possible moment.

After the main stop valve is closed at step S4, it is determined in step S15 whether an inhibit flag indicating that the EGR stop process is currently inhibited is set to "1". The inhibit flag is set to "0" when the processing illustrated in FIG. 6 is started, and the inhibit flag is set to "1" in the process performed in step S18, which is described in more detail below. If the determination in step S4 is NO, the processing proceeds to step S16, where it is determined whether the EGR stop process can be continuously performed.

In step S16, it is determined whether the anode pressure detected by the anode pressure sensor is lower than a predetermined lower limit pressure. The lower limit pressure is set to a value slightly lower than the discharge-time target pressure. If the main stop valve is closed, supply of the hydrogen gas from the high-pressure tank to the medium pressure portion is stopped. Accordingly, the pressure in the medium pressure portion decreases every time the injector is opened in order to increase the anode pressure. Thus, if the EGR stop process is continuously performed after the main stop valve is closed in step S4, the anode pressure cannot be maintained at the above-described target pressure using the injector and, thus, the anode pressure gradually decreases. By detecting a decrease in the anode pressure after the main stop valve is closed, a point in time at which the EGR stop process is suspended is determined in step S16.

If the determination in step S16 is YES, the processing proceeds to step S17, where the EGR stop process is inhibited. Thereafter, the processing proceeds to step S18, where the inhibit flag is set to "1" in order to indicate that the EGR stop process is inhibited. Subsequently, the processing proceeds to step S20.

However, if the determination in step S16 is NO, the processing proceeds to step S19, where it is determined whether the EGR discharge process is completed. If the determination in step S19 is YES, the processing proceeds to step S17, where the EGR stop process is inhibited, as described above. As described above, in the EGR stop process, the pressure maintenance process is performed after the EGR discharge process is completed. Since in the pressure maintenance process, the anode pressure is increased to the maintenance-time target pressure, the main stop valve needs to be opened. Accordingly, if the EGR discharge process is completed, the EGR stop process is suspended without continuously performing the pressure maintenance process.

If the determination in step S15 is YES or if, in step S18, the inhibit flag is set to "1", the processing proceeds to step S20, where the communication fueling is performed. Thereafter, the processing proceeds to step S21, where it is determined whether the communication fueling is completed. If the determination in step S21 is NO, the processing returns to step S15. In this manner, even after the main stop valve is closed, the EGR stop process and the communication fueling process are simultaneously performed until the last possible moment.

However, if the determination in step S21 is YES, that is, if the communication fueling is completed, the processing proceeds to step S22, where the main stop valve is opened. Thereafter, the processing proceeds to step S23. In step S23, it is determined whether the inhibit flag is "1". If the determination in step S23 is YES, that is, if the EGR stop process is suspended during the communication fueling, the processing proceeds to step S24, where the suspended EGR stop process is allowed to resume. Thus, the processing is completed. However, if the determination in step S23 is NO, that is, if the communication fueling is completed before the EGR stop process is suspended, the processing is completed so that the EGR stop process continues.

Figure 7:
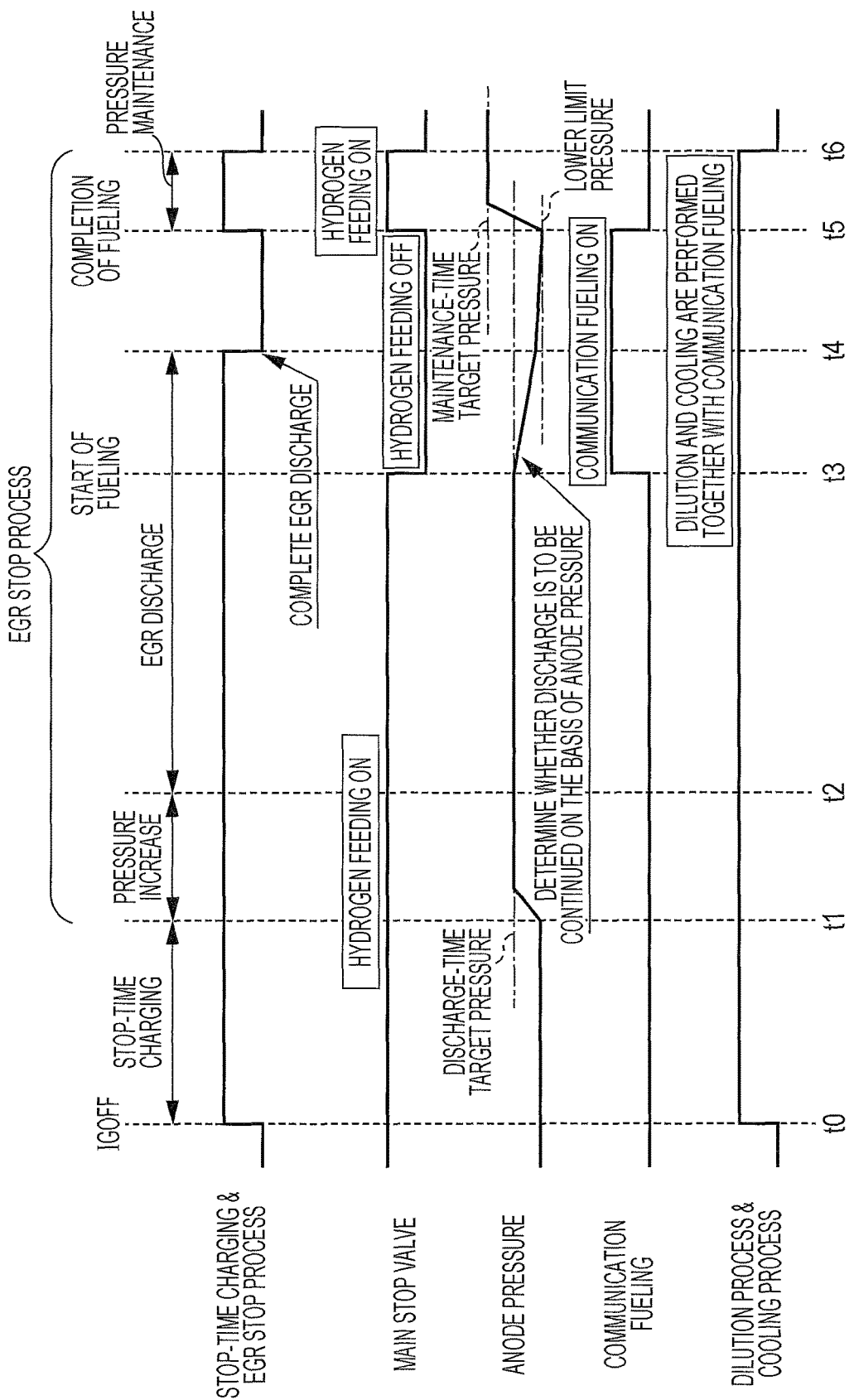
FIG. 7 is a timing diagram illustrating a particular example of the interruption control according to the second example.

FIG. 7 is a timing diagram illustrating a particular example of the interruption process according to the second example. In the example of FIG. 7, a system shutdown instruction is received at a time t0. Thus, the shutdown-time charging process, the cooling process, and the dilution process are simultaneously started at the time t0. Thereafter, at a time t1, the shutdown-time charging process is completed. Accordingly, the EGR stop process is started at the time t1.

The pressure increase process is performed from the time t1 to the time t2. Thus, the anode pressure is increased to the discharge-time target pressure. After the pressure increase process is completed, the EGR discharge process starts at the time t2. In this manner, oxygen remaining on the cathode side is consumed with the anode pressure maintained at the discharge-time target pressure.

After the EGR discharge process is started at the time t2, the user performs an operation to instruct start of the communication fueling at a time t3. Thus, the interruption control illustrated in FIG. 6 starts at the time t3. Accordingly, at the time t3, the main stop valve is closed (refer to step S4). Thereafter, the communication fueling and the EGR discharge process are simultaneously performed until the anode pressure decreases to the lower limit pressure (refer to step S16) or the EGR discharge process is completed (refer to step S19). Note that since the EGR discharge process is performed with the main stop valve closed after the time t3, the anode pressure gradually decreases.

At a time t4, the EGR discharge process is completed. Thus, the pressure maintenance process of the EGR stop process is suspended (refer to steps S19 and S17). Thereafter, at a time t5, the communication fueling is competed (refer to step S21). Thus, the main stop valve is opened (refer to step S22), and the pressure maintenance process of the EGR stop process that is suspended at the time t4 is resumed (refer to step S24). At a time t6, the pressure maintenance process is completed and, thus, the fuel cell system is completely shut down.

Third Example

Figure 8:
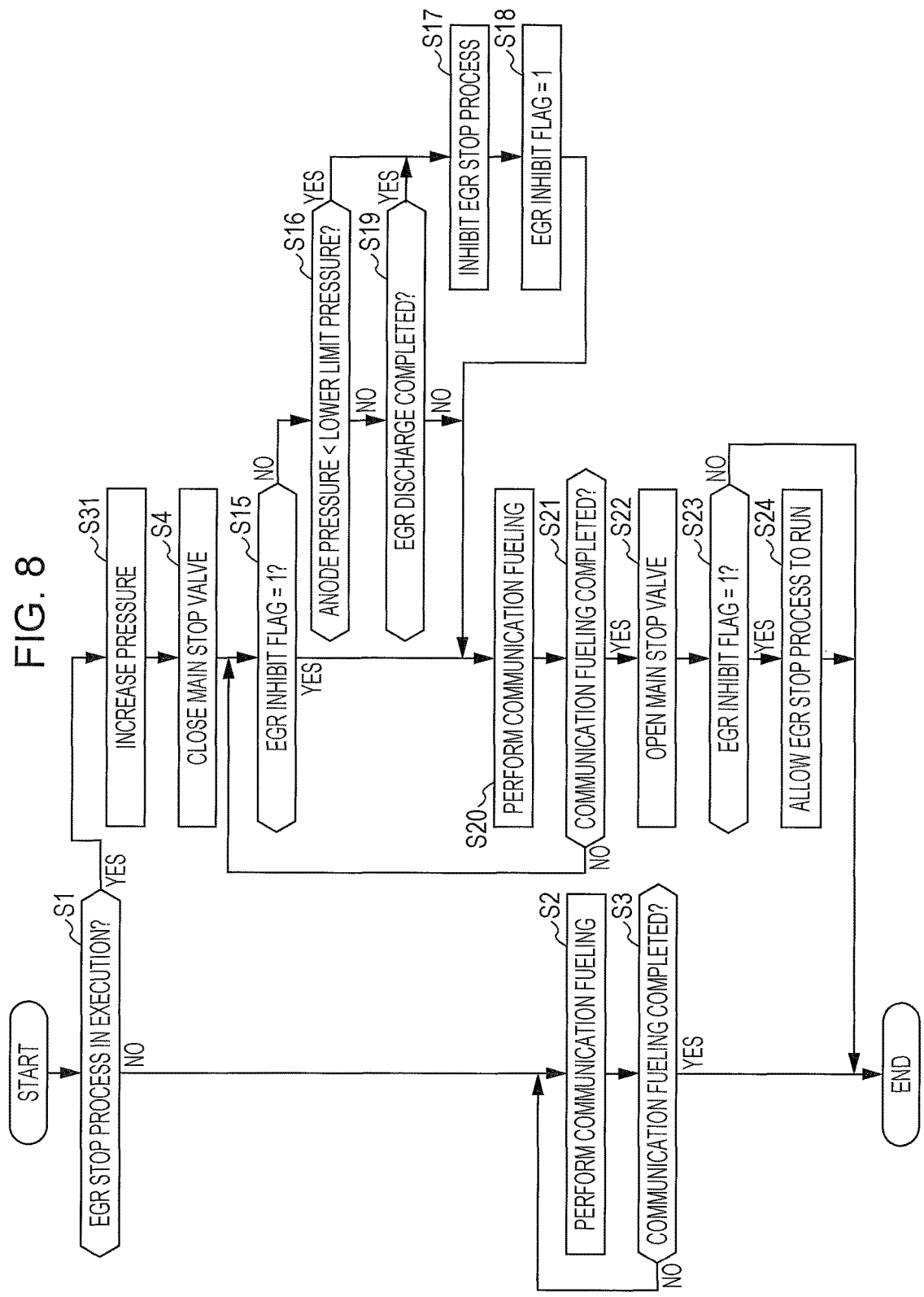
FIG. 8 is a flowchart illustrating a particular example of the interruption control according to a third example.

FIG. 8 is a flowchart illustrating a particular procedure for the interruption process of a third example performed by the ECU when a communication fueling request is received after a system shutdown instruction is received. Like the processing illustrated in FIGS. 4 and 6, the processing illustrated in FIG. 8 starts when the user performs a predetermined operation to instruct start of the communication fueling. Note that in the processing illustrated in FIG. 8, the processing in steps S1 to S4 and steps S15 to S24 is the same as that in FIG. 6. Accordingly, detailed description of the processing is not repeated. The interruption control according to the third example differs from that according to the second example in that before the main stop valve is closed in step S4, the pressure increase process is performed in step S31.

If, in step S1, it is determined that the EGR stop process is in execution, the processing proceeds to step S31. In step S31, the pressure increase process is performed. Thereafter, the processing proceeds to step S4, where the main stop valve is closed. More specifically, in step S31, the injector is driven with the pressure in the medium pressure portion sufficiently high before the main stop valve is closed so that the anode pressure is increased to a target pressure prior to valve closure. The target pressure prior to valve closure is higher than the above-described discharge-time target pressure. By performing the pressure increase process before the main stop valve is closed and increasing the anode pressure to higher than the normal target pressure in this manner, the EGR discharge process can be continuously performed for a long time even when the main stop valve is closed.

Figure 9:
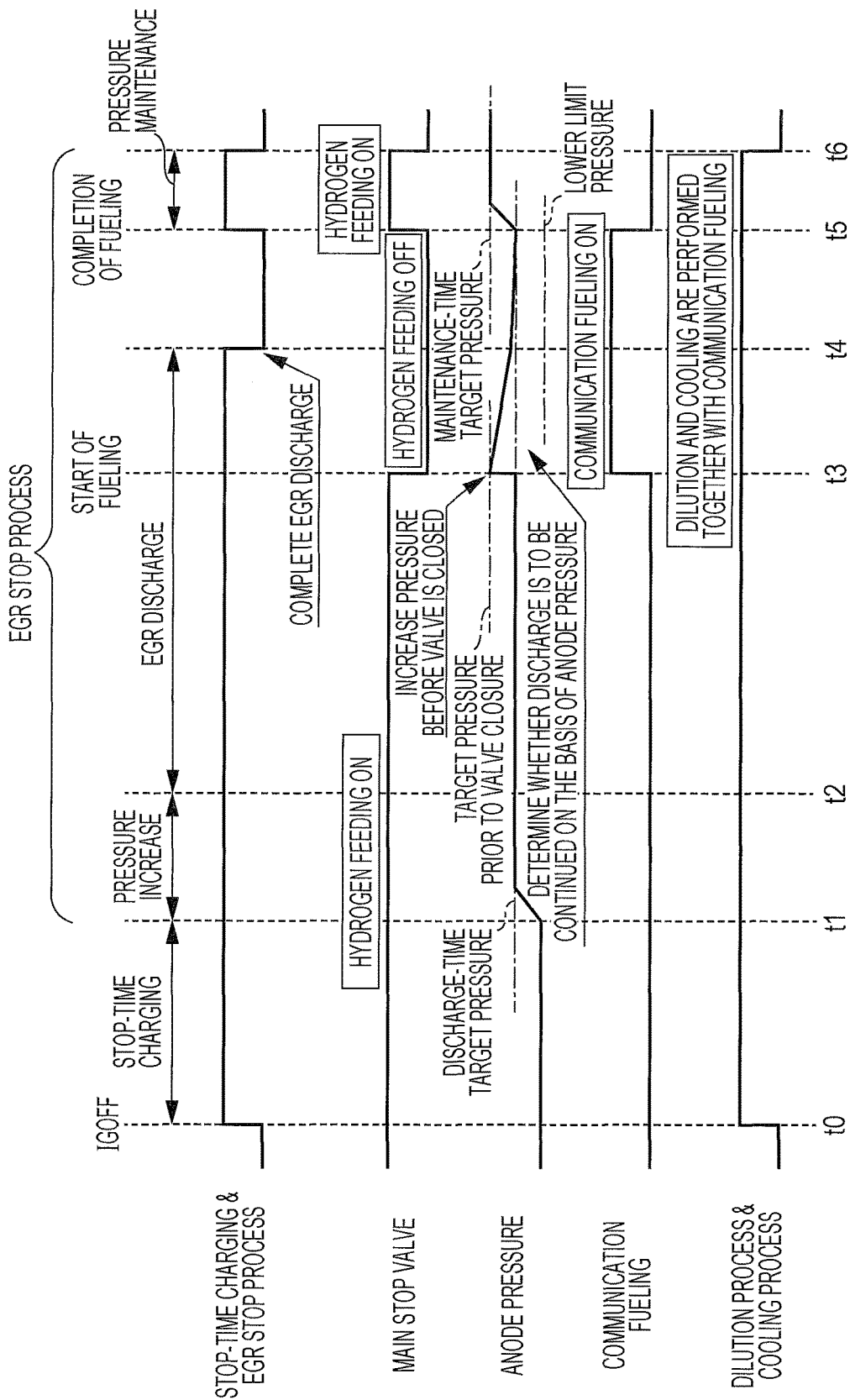
FIG. 9 is a timing diagram illustrating a particular example of the interruption control according to the third example.

FIG. 9 is a timing diagram illustrating a particular example of the interruption process according to the third example. In the example of FIG. 9, a system shutdown instruction is received at a time t0. Thus, the shutdown-time charging process, the cooling process, and the dilution process are simultaneously started at the time t0. Thereafter, at a time t1, the shutdown-time charging process is completed. Accordingly, the EGR stop process is started at the time t1.

The pressure increase process is performed from the time t1 to the time t2. Thus, the anode pressure is increased to the discharge-time target pressure. After the pressure increase process is completed, the EGR discharge process is started at the time t2. Thus, oxygen remaining on the cathode side is consumed with the anode pressure maintained at the discharge-time target pressure.

After the EGR discharge process is started at the time t2, the user performs an operation to instruct start of the communication fueling at a time t3. Thus, the interruption control illustrated in FIG. 8 starts at the time t3. Accordingly, at the time t3, the pressure increase process is performed (refer to step S31), and the main stop valve is closed (refer to step S4). Thereafter, the communication fueling and the EGR discharge process are simultaneously performed until the anode pressure decreases to the lower limit pressure or lower (refer to step S16) or the EGR discharge process is completed (refer to step S19). Note that after the time t3, the EGR discharge process is performed with the main stop valve closed. Accordingly, the anode pressure gradually decreases. However, when the main stop valve is closed, a sufficient anode pressure is maintained, as compared with the example of FIG. 7. Accordingly, the EGR discharge process and the communication fueling can be simultaneously performed for a longer time than in the example of FIG. 7.

Subsequently, the communication fueling is completed at a time t4. Accordingly, the pressure maintenance process of the EGR stop process is suspended (refer to steps S19 and S17). Thereafter, at a time t5, the communication fueling is completed (refer to step S21). Accordingly, the main stop valve is opened (refer to step S22), and the pressure maintenance process of the EGR stop process suspended at the time t4 is resumed (refer to step S24). At a time t6, the pressure maintenance process is completed. In this manner, the fuel cell system is completely shut down.

While the present technology has been described with reference to an embodiment of the technology, the application of the technology is not limited thereto. For example, while the present technology has been described with reference to the example in which the control method of an embodiment of the technology is applied to the fuel cell system 1 including the inlet sealing valve 42a and the outlet sealing valve 43a, the application of the technology is not limited thereto. In systems without such sealing valves, the EGR stop process may be replaced with a process in which air is supplied from an air compressor at a very slight flow rate to maintain the anode pressure at a pressure lower than the above-described EGR discharge-time target pressure and low stoichiometric electrical generation is performed for a predetermined period of time. The control method of an embodiment of the technology can be applied to even such a fuel cell system. Note that in such a case, it is difficult to simultaneously perform the communication fueling and the low stoichiometric electrical generation, as described in the second or third example. Accordingly, when an embodiment of the present technology is applied to such a fuel cell system, it is much desirable that the interruption control according to the first example be employed.

(1) A fuel cell system (e.g., a fuel cell system 1 described above) includes a fuel cell (e.g., a stack 2 described above) that generates electricity upon receiving fuel gas and oxidant gas supplied thereto, a storage container (e.g., a tank body 311 described above) that stores the fuel gas, a fuel gas feed path (e.g., a hydrogen feed pipe 32 described above) that connects the storage container to the fuel cell, a shutoff valve (e.g., a main stop valve 312 described above) disposed in the fuel gas feed path, and a transmitter (e.g., a the infrared transmitter 66 described above) that transmits a data signal indicating a state of the storage container to the outside. A method for controlling the fuel cell system includes a post-stop discharge step of opening the shutoff valve to supply fuel gas to the fuel cell after a fuel cell system shutdown instruction is sent to the fuel cell system and continuing electrical generation and discharge by the fuel cell (e.g., an EGR stop process illustrated in FIG. 3 and described above), a filling step of filling the storage container with the fuel gas supplied from a fuel supply source (e.g., a hydrogen fueling station 9 described above) located outside the fuel cell system while transmitting the data signal indicating a state of the storage container to the outside fuel supply source in response to a filling instruction to fill the storage container with the fuel gas (e.g., communication fueling described above), and a switching step of starting the above-described filling step after closing the shutoff valve if the filling instruction is output during the post-stop discharge step (e.g., interruption control illustrated in FIGS. 4, 6, and 8 and described above).

(2) In such a case, it is desirable that the method for controlling the fuel cell system further include a stop processing step of performing a system shutdown process in which the fuel gas is not supplied to the fuel cell after the fuel cell system shutdown instruction is sent to the fuel cell system, where the stop processing step is different from the post-stop discharge step. In addition, it is desirable that if, in the switching step, the filling instruction is output during a period of time during which the stop processing step and the post-stop discharge step are simultaneously performed, the shutoff valve be closed and the filling step and the stop processing step be simultaneously performed.

(3) In such a case, it is desirable that the fuel cell system further include a fuel gas circulation flow passage formed by connecting a fuel gas exhaust unit of the fuel cell to the fuel gas feed path (e.g., a hydrogen circulation flow passage described above), an oxidant circulation flow passage formed by connecting an oxidant gas inlet unit to an oxidant gas exhaust unit of the fuel cell (e.g., an oxygen circulation flow passage described above), and a fuel gas pressure detecting unit that detects a pressure in the fuel gas circulation flow passage (e.g., an anode pressure sensor 27 described above). In addition, it is desirable that, in the post-stop discharge step, by circulating the fuel gas in the fuel gas circulation flow passage and circulating the oxidant gas in the oxidant circulation flow passage with the shutoff valve open after a fuel cell system shutoff instruction is sent to the fuel cell system, electrical generation and discharge using the fuel cell be performed until the oxygen density in the oxidant circulation flow passage decreases to a predetermined density. Furthermore, it is desirable that in the switching step, the post-stop discharge step and the filling step be simultaneously performed after the shutoff valve is closed until the pressure detected by the fuel gas pressure detecting unit reaches a predetermined lower limit pressure (e.g., a lower limit pressure illustrated in FIG. 7 and described above) or lower. Still furthermore, it is desirable that after the detected pressure reaches the lower limit pressure or lower, the post-stop discharge step be suspended until the filling step is completed.

(4) In such a case, it is desirable that the fuel cell system further include a fuel gas circulation flow passage formed by connecting a fuel gas exhaust unit of the fuel cell to the fuel gas feed path, an oxidant circulation flow passage formed by connecting an oxidant gas inlet unit to an oxidant gas exhaust unit of the fuel cell, and a fuel gas injector (e.g., an injector 35 described above) that is disposed downstream of the shutoff valve in the fuel gas feed path and that feeds the fuel gas supplied from the storage container to the fuel gas circulation flow passage. In addition, it is desirable that in the post-stop discharge step, by circulating the oxidant gas in the oxidant circulation flow passage while controlling a pressure in the fuel gas circulation flow passage at a predetermined first pressure (e.g., a discharge-time target pressure illustrated in FIG. 9 and described above) using the fuel gas injector with the shutoff valve open after a fuel cell system shutoff instruction is sent to the fuel cell system, electrical generation and discharge using the fuel cell be performed until the oxygen density in the oxidant circulation flow passage decreases to a predetermined density. Furthermore, it is desirable that in the switching step, if the filling instruction is output, a pressure in the fuel gas circulation flow passage be increased to a second pressure (e.g., a target pressure prior to valve closure illustrated in FIG. 9 and described above) that is higher than the first pressure by the fuel gas injector, the shutoff valve be closed, and the post-stop discharge step and the filling step be simultaneously performed.

According to the method described in (1) above, the post-stop discharge step is performed regardless of user's intension in order to prevent deterioration of the fuel cell. In contrast, the filling step is performed to fill the storage container with the fuel gas as user's intention. Each of the steps is performed after a fuel cell system shutdown instruction is output. According to an embodiment of the present technology, if a filling instruction is output during the post-stop discharge step, the shutoff valve is closed and, thereafter, the filling step is started. That is, since, from user's viewpoint, the filling step that is performed as user's intention is performed in priority to the currently performed post-stop discharge step, the usability can be increased. In addition, according to an embodiment of the present technology, by closing the shutoff valve before the filling step starts, outflow of the fuel gas from the storage container to the fuel cell during the filling step can be prevented and, thus, a variation of the pressure and temperature of the storage container can be prevented. Accordingly, during the filling step, the transmitter can send a stable and accurate data signal to the outside fuel supply source. As a result, since the outside fuel supply source can correctly recognize the state of the storage container, the storage container can be fully filled in a short time.

According to the method described in (2) above, if a filling instruction is output while the stop processing step without supplying the fuel gas and the post-stop discharge step are simultaneously performed, the shutoff valve is closed and the filling step and the stop processing step are simultaneously performed. That is, according to an embodiment of the present technology, the stop processing step is performed regardless of reception of the filling instruction. Accordingly, since the stop processing step need not be delayed until the filling step is completed, a period of time required from the time a system shutdown instruction is received to the time the stop processing step is completed can be reduced. Thus, dissatisfaction of the user can be minimized.

According to the method described in (3) above, even after the shutoff valve is closed, the post-stop discharge step and the filling step are simultaneously performed until the pressure detected by the fuel gas pressure detecting unit reaches a predetermined lower limit pressure or lower. That is, according to an embodiment of the present technology, even after the shutoff valve is closed, the post-stop discharge step is performed until the last possible moment. By performing the post-stop discharge step and the filling step in this manner, a delay of the post-stop discharge step until completion of the filling step can be reduced. Thus, dissatisfaction of the user can be minimized.

According to the method described in (4) above, if the filling instruction is output during the post-stop discharge step, the pressure in the fuel gas circulation flow passage is increased to the second pressure by the fuel gas injector before the shutoff valve is closed. According to an embodiment of the present technology, by increasing the pressure in the fuel gas circulation flow passage before the shutoff valve is closed, the post-stop discharge step and the filling step can be simultaneously performed for a longer time. As a result, a delay of the post-stop discharge step until completion of the filling step can be reduced. Thus, dissatisfaction of the user can be minimized.

Obviously, numerous modifications and variations of the present invention are possible in light of the above teachings. It is therefore to be understood that within the scope of the appended claims, the invention may be practiced otherwise than as specifically described herein.

What is claimed is:

1. A method for controlling a fuel cell system including a fuel cell configured to generate electricity using fuel gas and oxidant gas supplied to the fuel cell, the method comprising:
   opening a shutoff valve to supply the fuel gas from a storage container to the fuel cell in response to a fuel cell system shutdown instruction sent to the fuel cell system so that the fuel cell generates and discharges electricity prior to a complete shutdown of the fuel cell and a subsequent start-up of the fuel cell;
   supplying to the storage container the fuel gas supplied from a fuel supply source provided outside the fuel cell system in response to a filling instruction to supply the fuel gas to the storage container;
   transmitting a data signal indicating a state of the storage container to the fuel supply source;
   interrupting the generation and discharge of electricity prior to the complete shutdown of the fuel cell by closing the shutoff valve and supplying to the storage container the fuel gas supplied from the fuel supply source in response to an output of the filling instruction, following a time when the shutoff valve is in an open state after the fuel cell system shutdown instruction is sent; and
   resuming the generation and discharge of electricity after interrupting the generation and discharge of electricity and before the subsequent start-up of the fuel cell.

2. A method for controlling a fuel cell system including a fuel cell configured to generate electricity using fuel gas and oxidant gas supplied to the fuel cell, the method comprising:
   opening a shutoff valve to supply the fuel gas from a storage container to the fuel cell after a fuel cell system shutdown instruction is sent to the fuel cell system so that the fuel cell generates and discharges electricity;
   supplying to the storage container the fuel gas supplied from a fuel supply source provided outside the fuel cell system in response to a filling instruction to supply the fuel gas to the storage container;
   transmitting a data signal indicating a state of the storage container to the fuel supply source; and
   closing the shutoff valve and supplying to the storage container the fuel gas supplied from the fuel supply source if the filling instruction is output, following a time when the shutoff valve is in an open state after the fuel cell system shutdown instruction is sent,
   wherein the fuel cell system further includes a fuel gas circulation flow passage formed by connecting a fuel gas exhaust device of the fuel cell to a fuel gas feed path, an oxidant circulation flow passage formed by connecting an oxidant gas inlet device to an oxidant gas exhaust device of the fuel cell, and a fuel gas pressure detector that detects a pressure in the fuel gas circulation flow passage,
   wherein in the opening of the shutoff valve, by circulating the fuel gas in the fuel gas circulation flow passage and circulating the oxidant gas in the oxidant circulation flow passage with the shutoff valve open after a fuel cell system shutoff instruction is sent to the fuel cell system, electrical generation and discharge using the fuel cell are performed until an oxygen density in the oxidant circulation flow passage decreases to a predetermined density, wherein in the closing of the shutoff valve, the opening of the shutoff valve and the supplying to the storage container are simultaneously performed after the shutoff valve is closed until the pressure detected by the fuel gas pressure detector reaches a predetermined lower limit pressure or lower, and wherein after the detected pressure reaches the lower limit pressure or lower, the opening of the shutoff valve is suspended until the supplying to the storage container is completed.

3. A method for controlling a fuel cell system including a fuel cell configured to generate electricity using fuel gas and oxidant gas supplied to the fuel cell, the method comprising:

opening a shutoff valve to supply the fuel gas from a storage container to the fuel cell after a fuel cell system shutdown instruction is sent to the fuel cell system so that the fuel cell generates and discharges electricity;

supplying to the storage container the fuel gas supplied from a fuel supply source provided outside the fuel cell system in response to a filling instruction to supply the fuel gas to the storage container;

transmitting a data signal indicating a state of the storage container to the fuel supply source; and closing the shutoff valve and supplying to the storage container the fuel gas supplied from the fuel supply source if the filling instruction is output, following a time when the shutoff valve is in an open state after the fuel cell system shutdown instruction is sent, wherein the fuel cell system further includes a fuel gas circulation flow passage formed by connecting a fuel gas exhaust device of the fuel cell to a fuel gas feed path, an oxidant circulation flow passage formed by connecting an oxidant gas inlet device to an oxidant gas exhaust device of the fuel cell, and a fuel gas injector that is disposed downstream of the shutoff valve in the fuel gas feed path and that feeds the fuel gas supplied from the storage container to the fuel gas circulation flow passage, wherein in the opening of the shutoff valve, by circulating the oxidant gas in the oxidant circulation flow passage while controlling a pressure in the fuel gas circulation flow passage at a predetermined first pressure using the fuel gas injector with the shutoff valve open after a fuel cell system shutoff instruction is sent to the fuel cell system, electrical generation and discharge using the fuel cell are performed until an oxygen density in the oxidant circulation flow passage decreases to a predetermined density, and wherein in the closing of the shutoff valve, if the filling instruction is output, a pressure in the fuel gas circulation flow passage is increased to a second pressure that is higher than the first pressure by the fuel gas injector, the shutoff valve is closed, and the opening of the shutoff valve and the supplying to the storage container are simultaneously performed.

4. The method according to claim 1, wherein resuming the generation and discharge of electricity includes opening the shutoff valve again to supply the fuel gas from a storage container to the fuel cell so that the fuel cell resumes generating and discharging electricity after the supplying to the storage container is completed.

5. The method according to claim 1, wherein the step of opening the shutoff valve to supply the fuel gas from the storage container to the fuel cell after the fuel cell system shutdown instruction is sent to the fuel cell system is accomplished by maintaining the shutoff valve in an open state immediately after the fuel cell system shutdown instruction is sent to the fuel cell system.

6. The method according to claim 1, wherein the opening the shutoff valve to supply the fuel gas from a storage container to the fuel cell is performed immediately after the fuel cell system shutdown instruction is sent to the fuel cell system.

7. The method according to claim 1, wherein the resuming the generation and discharge of electricity prior to the complete shutdown of the fuel cells is performed after the supplying to the storage container is completed, by again opening the shutoff valve to supply the fuel gas from the storage container to the fuel cell before the fuel cell system is completely shut down after the fuel cell system shutdown instruction is sent.

8. The method according to claim 7, further comprising completely shutting down the fuel cell system following the completion of the resumed generation and discharge of electricity.

* * * * *